Patented Feb. 21, 1950

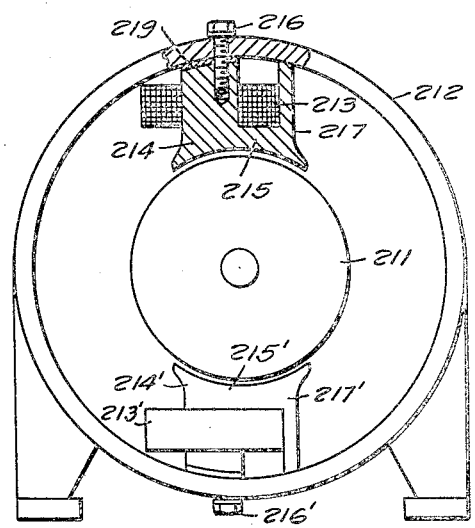
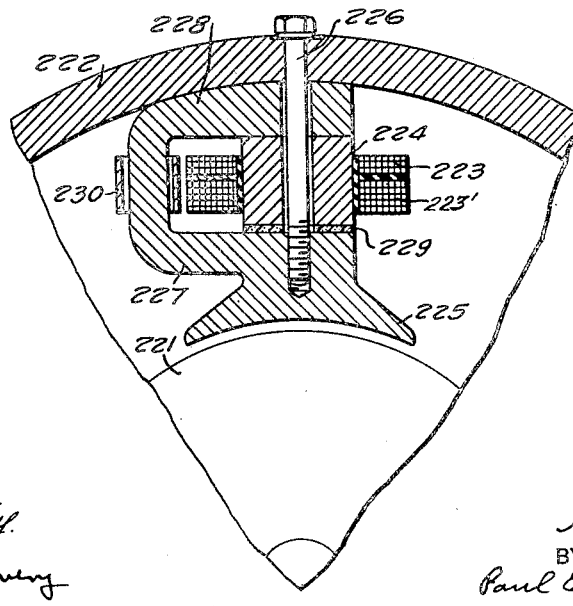

2,498,274

UNITED STATES PATENT OFFICE 2,498,274

ROTARY ELECTRIC MACHINE

Joe G. Ivy, Forest Hills, Pa., assignor to Westinghouse Electric Corporation, East Pittsburgh, Pa., a corporation of Pennsylvania Original application July 29, 1943, Serial No. 496,596. Divided and this application April 27, 1944, Serial No. 532,975

4 Claims. (Cl. 322—50)

This application is a division of my copending application, Serial No. 496,596, for Variable voltage control, filed July 29, 1943, now Patent No. 2,383,971, and concerns an invention relating to rotary electric machines such as generators.

It is an object of my invention to devise a rotary electric machine whose operating characteristic involves a limiting effect which occurs when the excitation of the machine passes beyond a given value or range and affords an automatic variation of the rate of change of a control or regulating function to be performed by the machine.

Another object, allied to the foregoing, is to provide a generator which varies the rate of change of its output voltage or current when its field excitation passes through a given saturation value; and it is also an object to devise such a generator which is capable of producing a current or voltage biasing or limiting effect in motor generator systems of the Ward Leonard type.

In conjunction with the foregoing objects, it is also an aim of my invention to render the machine capable of being adjusted, it will and while being in operation, as regards the excitation or other control value at which the rate of change in control or regulating function is to occur.

In order to achieve these objects, and in accordance with my invention, a rotary electric machine is equipped with salient poles that have a main magnetic flux path linked with a saturable shunt path, so that the amount of flux passing from the poles through the machine armature is considerably reduced or virtually eliminated by the bypassing effect of the shunt path as long as the field excitation is too low to saturate the shunt and increases greatly when the shunt path is saturated by a higher field excitation. According to another feature of my invention, a section of high magnetic reluctance, preferably a non-magnetic shim, is inserted in series to the shunted main flux path of the pole structure.

In one of its other aspects, a machine according to my invention has at least two field windings on its shunted main pole structure, one winding for providing a variable excitation governed by the control magnitude to which the control function of the machine is to respond, and the other for producing an adjustable constant excitation or premagnetization in order to permit setting the value of the control magnitude at which the change in control function will take place.

In another aspect of the invention, the above-mentioned shunted main pole structure is equipped with a self-excited field winding, i. e., a winding connected with the armature of the machine. As a result, the change in operation at the initial value of excitation occurs in a more pronounced, amplified manner for increasing the sensitivity of response of the machine.

These and other objects and features of the invention will be apparent from the embodiment illustrated in the accompanying drawings, in which:

Figure 1 is a part-sectional front view of a machine designed in accordance with the invention;

Fig. 2 is a partial and part-sectional view of another modification;

Figure 3:
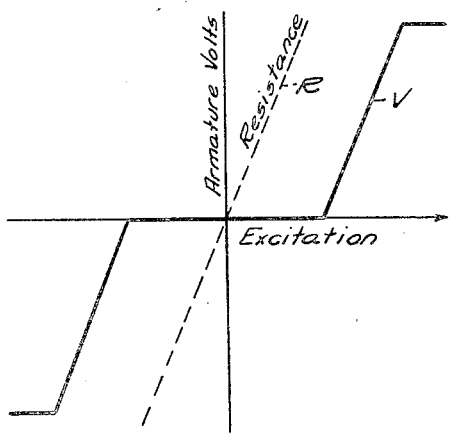
Figs. 3, 4 and 5 are explanatory diagrams relating to machines of the type shown in Figs. 1 and 2.

Referring to the generator shown in Figure 1, the generator armature is denoted by 211, the magnetizable frame by 212 and the field windings by 213 and 213'. The windings are inductively associated with magnetic pole structures consisting of a main pole portion 214 or 214' and a shunt portion 217 and 217', respectively. Main portion and shunt portion of each structure consist of an integral piece of magnetic material and form a pole shoe at 215 and 215', respectively. Thus, the main portion and shunt portion have together an integral pole surface in proximity to the periphery of the armature 211. Each pole structure is attached to the frame 212 by a screw 216 or 216', and is provided with a shim or gap at 219. The shunt portion forms a bypass and diverts part of the magnetic flux of the main portion 214 from the armature 211. In this embodiment, the magnetic shunt portions are also so rated that they become saturated at a field excitation insufficient to saturate the main pole portions.

In the embodiment of Fig. 2, the magnetizable frame 222 of the machine is provided with field poles composed of a central portion 224 and an integral piece of magnetic material which forms a shunt path at 227, a base section 228, and a pole shoe portion 225. The field windings 223 are arranged on the central portion 224. A section of high magnetic reluctance, consisting of a non-magnetic shim 229 or an air gap, is located between the central portion 224 and the pole shoe portion 225. A screw 226 preferably of non-magnetic material serves to join the field pole with the frame 222, so as to establish magnetic contact between the contact surface formed by the base portion 228 and the corresponding surface portion of the frame 222. The shunt portion 227 is rated for saturation at a field excitation lower than that required for saturating the central portion 224. The pole surface formed by the pole shoe portion 225 is in proximity to the peripheral surface of the armature 221. Similar to the examples previously described, the shunt path 227 bypasses part of the flux of portion 224 and reduces the flux from the pole shoe surface to the armature accordingly. The bypass becomes virtually ineffective when the excitation of windings 223 exceeds the saturation value of the shunt path. A short-circuited winding 230 of a few turns, a single turn being sufficient in many cases, may be placed on the shunt portion 227 for a purpose to be discussed in a later place.

For explaining the operation of a generator according to the above-described embodiments, let us assume that it is to be used for regulating or control purposes so as to generate, when driven at constant speed, an armature voltage that remains zero or negligible at a low excitation of the generator field windings and rises abruptly to a high value as soon as the field excitation exceeds a magnitude determined by the saturation characteristic of the magnetic shunt path. In order to produce such an effect, the ideal magnetic saturation curve of the generator would be similar to that typified by curve $v$ in Fig. 4. In the coordinate system of Fig. 4, the abscissa represents values of excitation effective in the field windings, while the ordinate show the generated armature output voltage.

Figure 4:
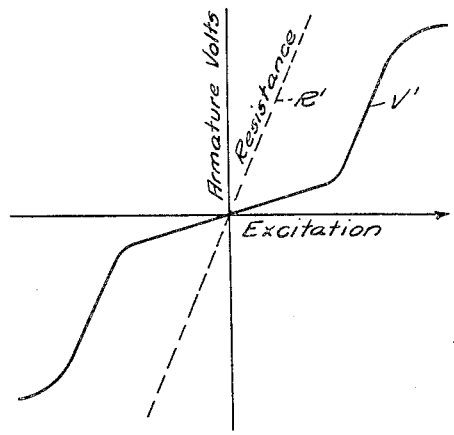

In reality, machines according to Figs. 1 and 2 have a saturation curve similar to curve $v'$ in the diagram of Fig. 4, in which the abscissa and ordinate have the same meaning as in the ideal diagram of Fig. 3. According to Fig. 4, if the ampere turns of the generator field are gradually increased, the generated voltage will at first rise slowly because most of the magnetic flux is bypassed by the magnetic shunt of the field poles. At a certain value of ampere turns, however, the shunt path becomes saturated so that now the flux traverses the armature of the machine and hence causes a voltage to be generated. As a result, the rate of change of the voltage curve changes abruptly. That is, the output voltage in the regulator armature circuit increases suddenly, relative to a gradual increase in excitation, to a value considerably higher than that previously effective. The effect of a shim or gap, such as shown at 219 and 229 in Figs. 1 and 2, respectively, is to require a greater number of ampere turns excitation before the saturation and the sudden increase of output voltage take place.

While the just-mentioned function can be achieved with a single field winding on the main portion of the machine poles, further advantages are obtained by adding to the principal field winding one or several other windings. Fig. 2 shows such an additional winding at 223'. This additional winding may be connected to the generator armature to provide self excitation. The presence of a self-energizing field, such as produced by the field winding 223' amplifies the saturation effect (Fig. 4) and causes the armature voltage to rise more rapidly immediately after the saturation of the shunt. The self-energizing field of the regulating generator should be proportioned so that the field resistance or air gap line, represented in Figs. 3 and 4 by the dash lines R and R', respectively, is almost parallel to the steepest portion of the magnetization curve. The machine will then almost, but not quite, sustain its generated voltage. It should be noted that while the presence of the just-mentioned self-energizing field, either in series or in parallel connection, will improve the operation of the regulating generator, the basic effect elucidated by Figs. 3 and 4 can also be obtained to a somewhat lesser degree without such a winding.

Figure 5:
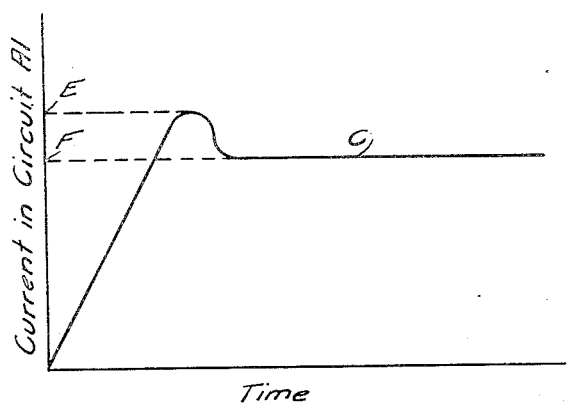

For certain applications, the current to be limited by a regulating generator according to the invention may climb very rapidly. Due to the inductance of the regulator fields, this regulating generator may not respond instantly but will allow the current to exceed its predetermined limit value for a short period before the corrective action becomes effective. This "overshooting" of the regulator current is elucidated by the diagram of Fig. 5.

It will be seen that the current $c$ rises first to E, i. e. above the intended ultimate value F and then drops back to value F. Such a characteristic is undesirable. However, by giving the regulator generator an anticipatory action, it is possible to reduce or eliminate this "overshooting." The means for accomplishing this are represented in Fig. 2 by the short-circuited turn or winding 230 on the magnetic shunt. When the regulator excitation rises rapidly, this turn prevents the flux from rising rapidly in the magnetic shunt path. As a result, the flux is forced through the main pole body and hence through the armature where it generates a corrective voltage before the shunt path saturates. This action is transient, and during the transient period the regulator starts to exert a corrective influence at a lower value of current, i. e. lower regulator field excitation, than it does under steady operating conditions. When the current is reduced rapidly, the characteristics of the regulator remain practically unchanged. The magnetic shunt path which has flux trapped in it by the shorted turn loses this flux slowly. The flux path extends primarily through the main pole body as the excitation is below the value necessary to saturate the shunt and hence generates no voltage in the armature circuit. There is little or no tendency to "hang on" due to the shorted winding.

It will be noted that the last-described feature involving the short-circuited turn on the magnetic shunt path is not absolutely necessary as regards the fundamental operation of the regulating generator, but is of advantage in cases where a rapid increase of regulated current is to be expected and where this fact may lead to a disturbing effect.

It will be obvious to those skilled in the art that if a machine according to the invention is used as a motor, its speed-torque characteristic will vary its rate of change, in a manner similar to the change of voltage characteristic explained by Figs. 3 and 4, when the energization of the motor field windings pass through the saturation value of the shunt path.

It will also be obvious that various modifications and changes, especially as regards shape and arrangement of the main pole portions, shunt portions and shims can be modified, as exemplified by the different structures shown in Figs. 1 and 2, without departing from the scope and essential features of the invention as set forth in the following claims.

I claim as my invention:

1. An electric generator comprising an armature, a stator frame equipped with magnetic field pole structures each having a main portion and a shunt portion in magnetic parallel connection with each other, field windings inductively associated only with said respective main portions to induce a magnetic flux therein, said shunt portions being rated for saturation at a lower excitation of said respective winding than said respective main portions and arranged to bypass when unsaturated the major part of said flux relative to said armature, each of said pole structures having a pole shoe portion integral with said respective main and shunt portions and forming a continuous pole surface in proximity to said armature, each of said shunt portions being directly connected in magnetic respect between the appertaining pole shoe portion and said frame, and a substantially non-magnetic gap element disposed between said frame and each of said pole shoe portions in series with the appertaining main pole portion and in parallel relation to the appertaining shunt portion.

2. An electric generator comprising an armature, a magnetizable stator frame surrounding said armature, magnetic field poles disposed on said frame and each having a main pole portion and a magnetic shunt portion, said two portions having together an integral continuous pole surface in proximity to said armature and another integral and continuous surface in magnetic contact with said frame, each of said field poles having a field winding disposed only on said main portion, said shunt portion being rated for saturation at a lower field strength of said winding than said main portion, and a non-magnetic shim disposed at a place located intermediate said two surfaces in series relation to said main pole portion and in parallel relation to said shunt portion.

3. An electric generator comprising an armature, magnetic field poles each having a main portion of relatively high saturation induction, a substantially non-magnetic shim arranged in series with said main portion, shunt means of relatively low saturation induction arranged in magnetic parallel connection with said main portion and shim, field winding means inductively associated with each of said field poles and rated for normally inducing therein a magnetic flux at which said shunt means are unsaturated so that most of said flux is shunted away from said armature as long as the excitation of said field winding means remains within its normal range.

4. An electric generator comprising an armature, a stator frame, magnetic field poles disposed on said frame and each composed of a main portion and a shunt portion arranged in magnetic parallel connection with each other and having a common pole shoe portion so as to have a single continuous pole surface facing said armature, said shunt portion extending between said pole shoe portion and said frame, a field winding inductively associated with each of said field poles to produce a magnetic flux therein, said shunt portion being rated for saturation at a lower field strength of said winding than said main portion and arranged to bypass part of said flux relative to said armature, each of said field poles having a substantially non-magnetic gap element located between said pole shoe portion and said frame in magnetic series relation to said main pole portion and in magnetic parallel relation to said shunt portion.

JOE G. IVY.

REFERENCES CITED

The following references are of record in the file of this patent:

UNITED STATES PATENTS

| Number | Name | Date |
|---|---|---|
| 1,774,304 | Turbayne | Aug. 26, 1930 |
| 1,994,609 | Hobart | Mar. 19, 1935 |
| 2,256,239 | Caldwell | Sept. 16, 1941 |

FOREIGN PATENTS

| Number | Country | Date |
|---|---|---|
| 233,235 | Germany | Apr. 3, 1911 |